United States Patent [19]

Neag et al.

[11] Patent Number: 5,791,533
[45] Date of Patent: Aug. 11, 1998

[54] SYSTEM FOR MOUNTING A SPARE TIRE ON A VEHICLE

[75] Inventors: Dorinel D. Neag, Commerce Township; Thomas R. Carbone, Grosse Pointe; James P. Salva, Shelby Township; Stylianos A. Meidanis, Lincoln Park; Leonard C. Paul, Jr., Dearborn Heights; Jeffery E. Long, Canton, all of Mich.

[73] Assignee: Chrysler Corporation, Auburn Hills, Mich.

[21] Appl. No.: 780,910

[22] Filed: Jan. 9, 1997

[51] Int. Cl.[6] .................................................. B62D 43/02
[52] U.S. Cl. ..................... 224/42.21; 224/282; 224/496; 224/509
[58] Field of Search ........................ 224/402, 282, 224/484, 496, 509, 511, 517, 553, 42.21, 42.24, 42.25, 42.28; 414/466, 465

[56] References Cited

U.S. PATENT DOCUMENTS

| | | | |
|---|---|---|---|
| 2,210,085 | 8/1940 | Langdon | 414/465 |
| 3,283,973 | 11/1966 | Wargo | 224/42.21 |
| 3,753,520 | 8/1973 | Bodde | 224/42.21 X |
| 3,845,891 | 11/1974 | Becher | 224/42.21 |
| 4,019,664 | 4/1977 | Weiler | 224/42.24 |
| 4,116,373 | 9/1978 | Bryngelson | 224/42.21 |
| 4,212,417 | 7/1980 | Scott | 224/42.21 |
| 4,434,919 | 3/1984 | Flowers | 224/42.21 |
| 4,817,834 | 4/1989 | Weiler | |
| 4,869,409 | 9/1989 | Wright | 224/42.21 |
| 5,020,707 | 6/1991 | Nozel et al. | 224/42.21 |
| 5,094,374 | 3/1992 | Lee | 224/42.21 |
| 5,333,766 | 8/1994 | Fisher | 224/42.21 |

Primary Examiner—Renee S. Luebke
Attorney, Agent, or Firm—Roland A. Fuller, III

[57] ABSTRACT

A system for mounting a spare tire on a vehicle that has a hatch and a door frame that partially surrounds the hatch. The system includes an exterior tire mounted mode and an interior tire mounted mode. The system also includes an exterior holder device disposed in the hatch and an interior holder device disposed in an inner side wall of the vehicle. Further provided is an arm that is swivelably mounted to one side of the door frame of the vehicle at a first end portion. The arm has a middle portion and second end portion that has the spare tire mounted thereon. The system further provides an engagement member attached at the second end portion of the arm. The engagement member includes a device for engaging the exterior holder device when the system is in the exterior tire mounted mode and for engaging the interior holder device when the system is in the interior tire mounted mode.

11 Claims, 7 Drawing Sheets

SYSTEM FOR MOUNTING A SPARE TIRE ON A VEHICLE

BACKGROUND

1. Field of the Invention

In general, the present invention relates to spare tire carriers for vehicles, and in particular, the present invention relates to a system for mounting a spare tire on a vehicle.

2. Description of the Related Art

Recent popularity of so called "Sport Utility Vehicles" has presented manufacturers with issues on how to efficiently store the large spare tires that are necessitated because of the vehicles' four wheel-drive capabilities. In the past, spare tires have been mounted to the under-carriage of vehicles, but this has proved undesirable because of under carriage space and clearance constraints. Under-carriage mounted spare tires are also difficult to remove. Attempts at mounting spare tires to the rear hatch have not met with wide acceptance from vehicle owners for aesthetic reasons and because the hatch mounted spare tires do not allow the entire back hatch and window of the vehicle to be cleaned when washed. Vehicles that only allow for mounting of the spare tire in the rear or cargo area of the vehicle have not gained wide acceptance from vehicle owners because the large spare tires take up precious cargo space when items such as groceries need to be carried in the rear of the vehicle. Other vehicle manufacturers have tried to provide for storage of the spare tire in both the rear compartment and on the rear hatch of the vehicle such as the multiple-position spare tire mount of U.S. Pat. No. 4,434,919 to Flowers, which requires a tire well to be disposed within the floor board in the rear of the vehicle for the spare tire to partially sit therein.

SUMMARY OF THE INVENTION

The present invention eliminates the oversights, difficulties, and disadvantages of the prior art by providing a system for mounting a spare tire on a vehicle that has a hatch and a door frame that partially surrounds the hatch. The system includes an exterior tire mounted mode and an interior tire mounted mode. The system also includes an exterior holder device disposed in the hatch and an interior holder device disposed in an inner side wall of the vehicle. Further provided is at least one arm that is swivelably mounted to one side of the door frame of the vehicle at a first end portion. The arm has a middle portion and second end portion that has the spare tire mounted thereon. The system further provides an engagement member attached at the second end portion of the arm. The engagement member includes a device for engaging the exterior holder device when the system is in the exterior tire mounted mode and for engaging the interior holder device when the system is in the interior tire mounted mode.

Other objects, features and advantages of the present invention will become apparent by reference to the following detailed description when considered in conjunction with the accompanying drawings.

BRIEF DESCRIPTION OF THE DRAWINGS

In the drawings below, reference characters refer to like parts throughout the views, and wherein.

DESCRIPTION OF THE PREFERRED EMBODIMENT(S)

Figure 1:
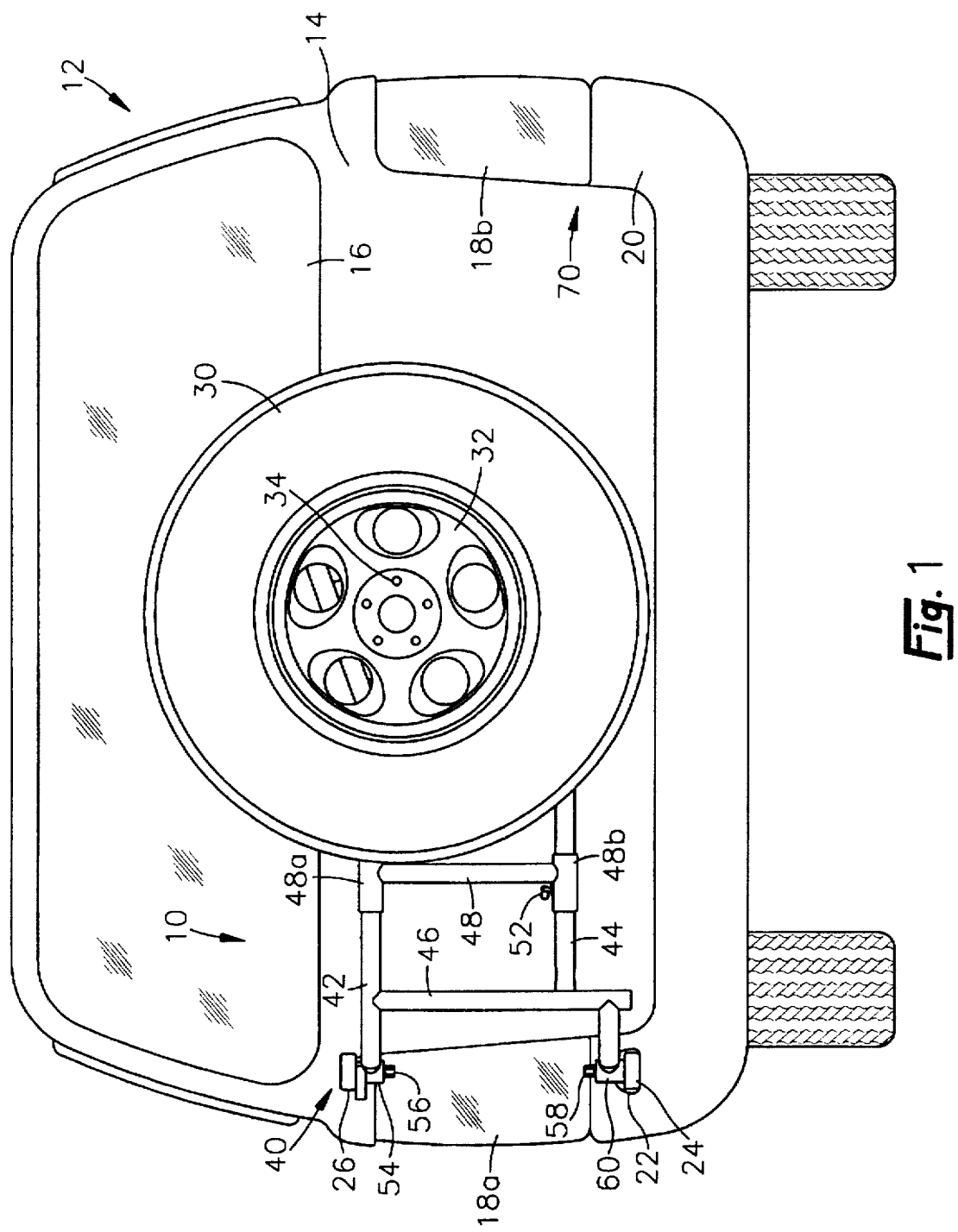
FIG. 1 is a plan view of a spare tire mounted to a rear hatch of a vehicle showing a system of the present invention in an exterior tire mounted mode.

Commencing with FIG. 1, a system 10 for mounting a spare tire 30 on a vehicle 12 is shown. The vehicle 12 has a hatch 14, which opens upward toward the top of the vehicle 12. Disposed in hatch 14 is a window 16, and a door frame 70 that partially surrounds the hatch 14 and has disposed therein tail lights 18a and 18b. The vehicle 12 further includes a bumper 20 that extends laterally across the rear of vehicle 12 and below tail lights 18a and 18b. Mounted on hatch 14 is the spare tire 30 that is secured to rim 32.

Figure 4:
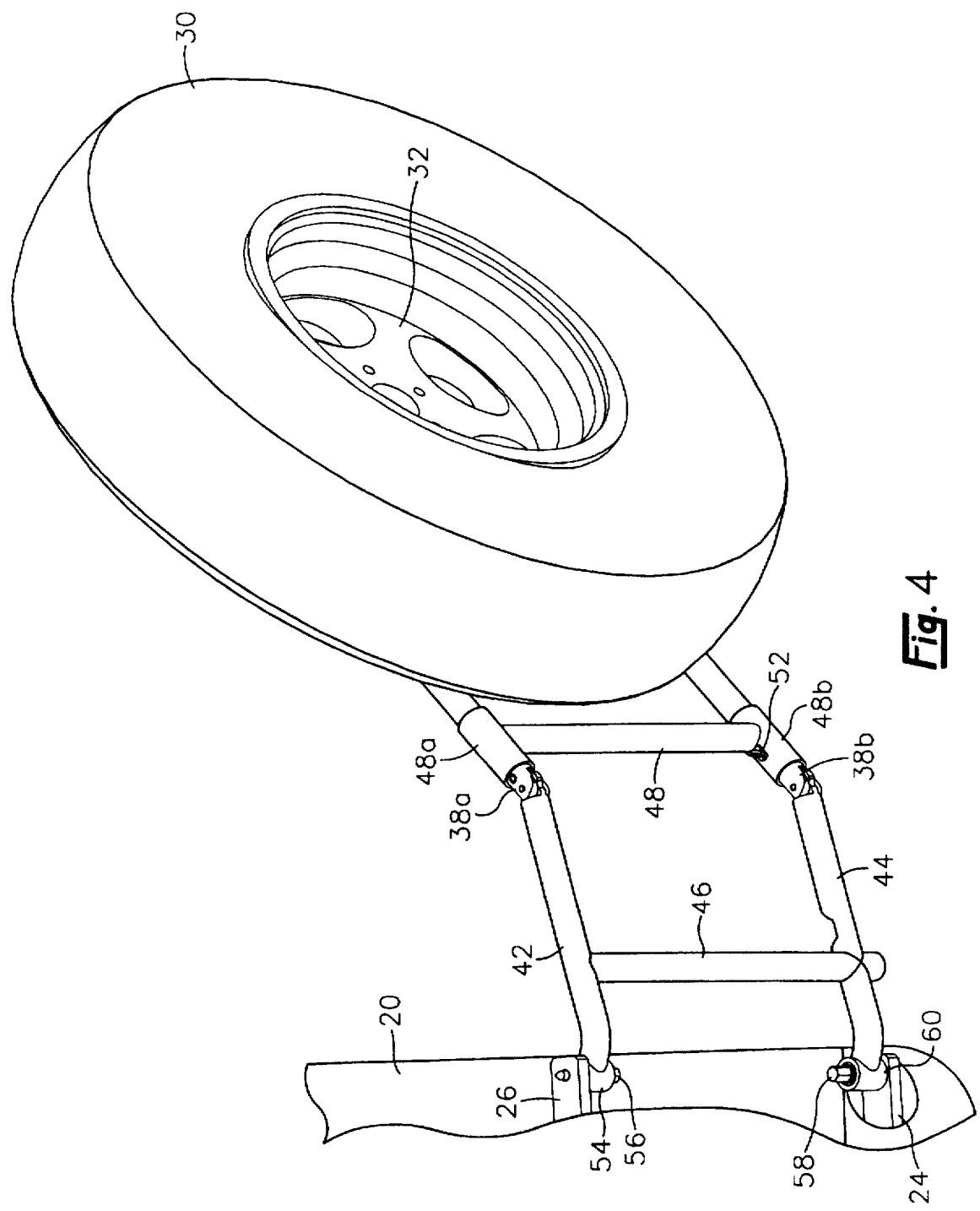
FIG. 4 is a perspective view of first and second bifurcated arms of a frame member of the system of the present invention.
Figure 6:
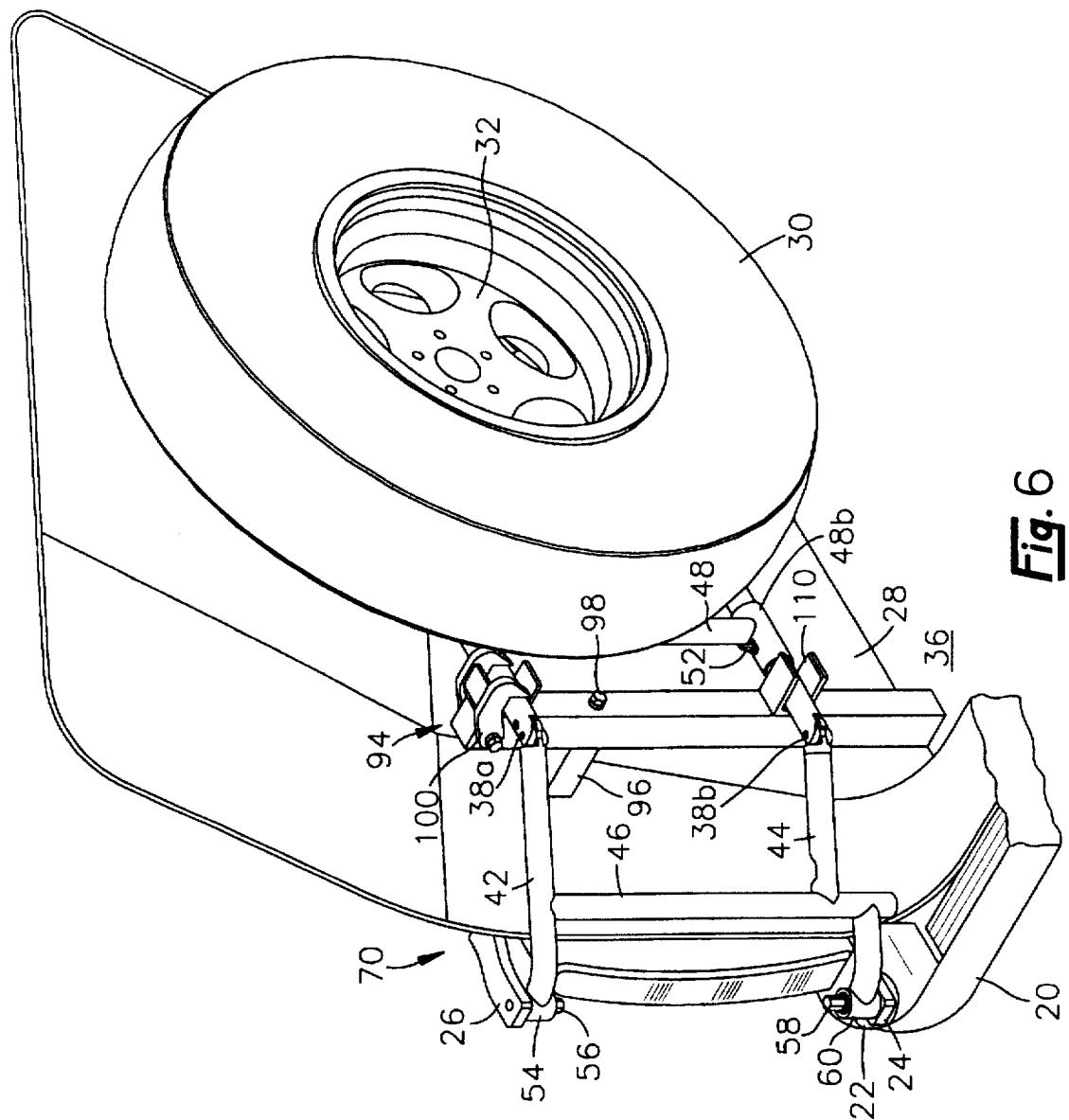
FIG. 6 is a perspective view of the spare tire secured to the inner side wall of the vehicle when the system of the present invention is in an interior tire mounted mode.

In FIG. 1, the present system 10 is shown in an exterior tire mounted mode with the spare tire 30 being attached to the hatch 14 of vehicle 12. The system 10 includes a frame member 40 that has first and second bifurcated arms 42 and 44 that are each swivelably mounted to one side of the door frame 70 at a first end portion. As best shown in FIG. 4, the first and second bifurcated arms 42 and 44 each include hinges 38a and 38b, respectively. The hinges 38a and 38b are at a middle portion of the first and second bifurcated arms 42 and 44. As is best shown in FIG. 6, the hinges 38a and 38b allow the spare tire 30 to be secured to an interior side wall 28 of vehicle 12, by allowing the first and second bifurcated arms 42 and 44 to extend around the door frame 70 when the system 10 is in an interior tire mounted mode.

As shown in FIGS. 1, 2, 6, and 7, the present system 10 includes lower and upper vehicle mount members 24 and 26, which are secured to lower and upper mount members 60 and 54, by bolts 58 and 56, respectively. Upper vehicle mount member 26 is attached to frame member 70 of vehicle 12, and lower mount member 24 is disposed in a cavity 22 that is located in bumper 20.

Figure 2:
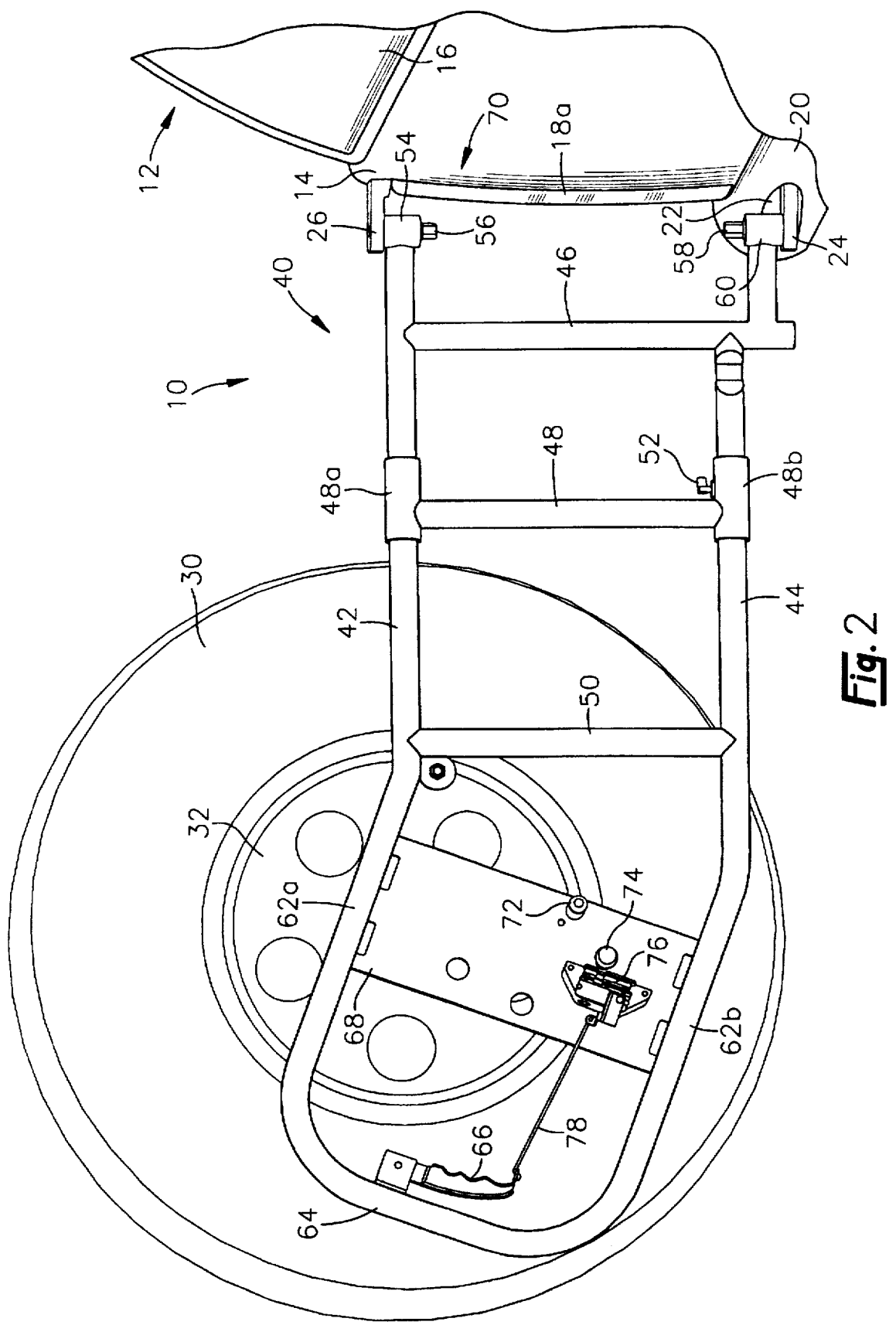
FIG. 2 is a side elevational view of the spare tire and an associated engagement member of the system of the present invention.

As is best shown in FIGS. 1, 2, and 4, the present system 10 further includes a first support piece 46 that is secured between the first and second bifurcated arms 42 and 44, to give support. A second support piece 48 is slidably attached at the middle portion between the first and second arms 42 and 44. The second support piece 48 includes first and second sleeves 48a and 48b that surround the first and second bifurcated arms 42 and 44, respectively, at each middle portion. The second support piece 48 further includes a pivot tab 52 that loosens or tightens the second support piece 48 to the first and second arms 42 and 44 upon actuation. When tab 52 is pivoted such that the second support piece 48 is loosened, sleeve 48b, which the tab 52 is disposed in, becomes slideable as does sleeve 48a along arm 44 and arm 42, respectively. When such is the case, the second support piece 48 can be slid such that hinges 38a and 38b are revealed, and become operable allowing the spare tire 30 to be secured to the interior side wall 28 of the vehicle 12 when the system 10 is in the interior tire mounted mode. Conversely, when tab 52 is tightened such that sleeves 48a and 48b are not slidable along first and second arms 42 and 44, respectively, hinges 38a and 38b are covered and are inoperable such that spare tire 30 may be mounted to the hatch 14 of vehicle 12 when the system 10 is in the exterior tire mounted mode.

As is best shown in FIG. 2, further attached between the first and second bifurcated arms 42 and 44, is a third support piece 50. Capping off attachment arms 62a and 62b is a rounded bar 64. The first and second bifurcated arms 42 and 44 extend into angled attachment arms 62a and 62b to which the engagement member 68 is attached thereto. The spare tire 30 is mounted on a second end portion of the first and second bifurcated arms 42 and 44. This is accomplished by a plurality of apertures 34 that are disposed in rim 32 (as shown in FIG. 1) through which a plurality of corresponding bolts can be inserted therethrough and extend into an engagement member 68 that is attached between the first and second arms 42 and 44 at the second end portion.

Figure 3:
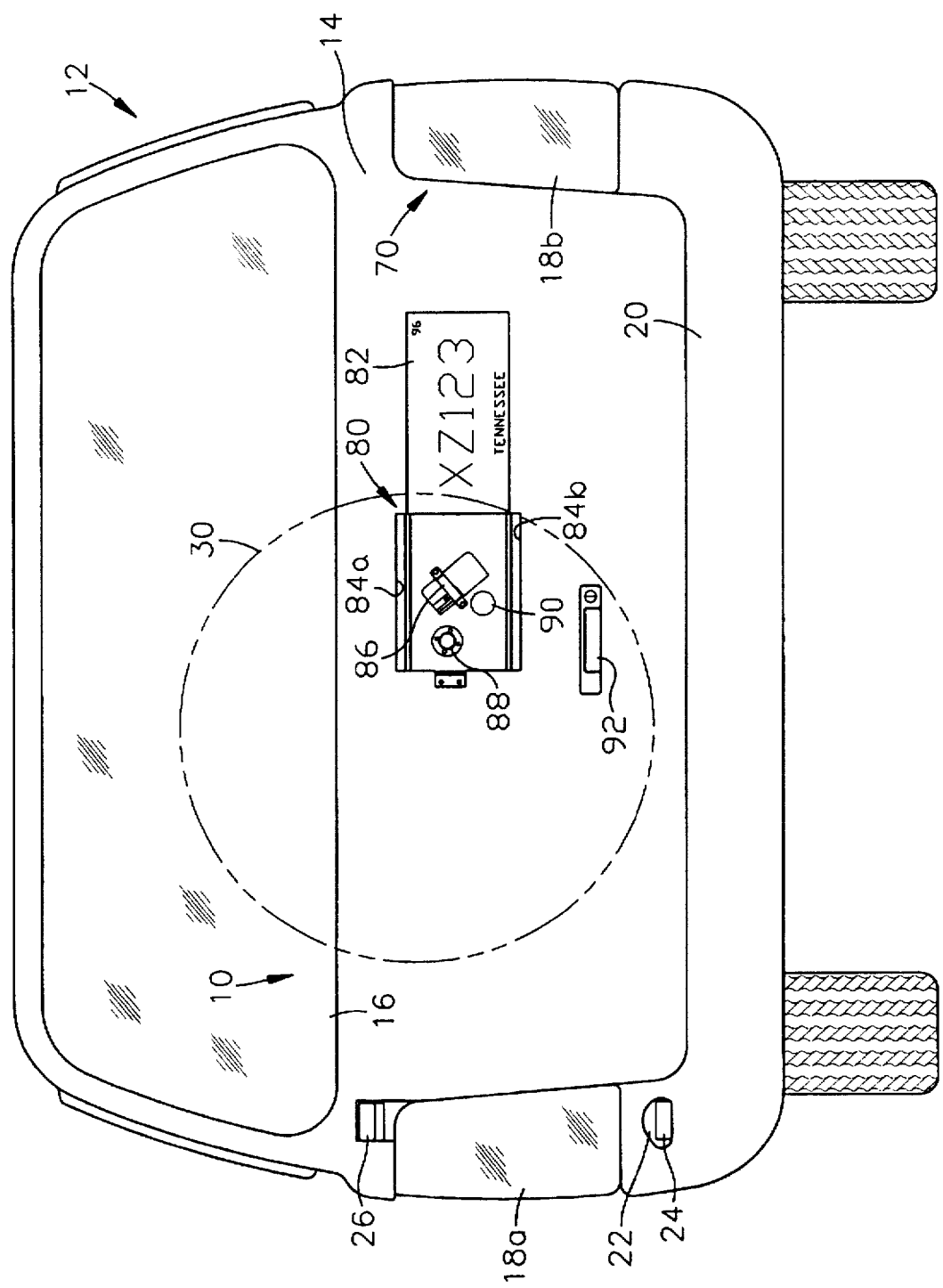
FIG. 3 is a plan view of the rear hatch of the vehicle showing a license plate holder device that the engagement member engages when the system of the present invention is in the exterior tire mounted mode.

As shown in FIG. 3, a license plate holder device 80 is disposed in hatch 14 and includes bifurcated slots 84a and 84b for slidably receiving a license plate 82 therein. The license plate holder device 80 further includes a bar 86, disposed therein and receptacles 88 and 90. When the system 10 is operating in the interior tire mounted mode, the license plate 82 is slid within bifurcated slots 84a and 84b such that the bar 86 and receptacles 88 and 90 are covered beneath the license plate 82. When, however, the system 10 is operating in the exterior tire mounted mode the license plate 82 is slid to one side of the license plate holder device 80 such that it remains visible when the spare tire 30 is mounted to hatch 14. Further disposed in hatch 14 is a latch handle 92 for opening the hatch 14.

Figure 5:
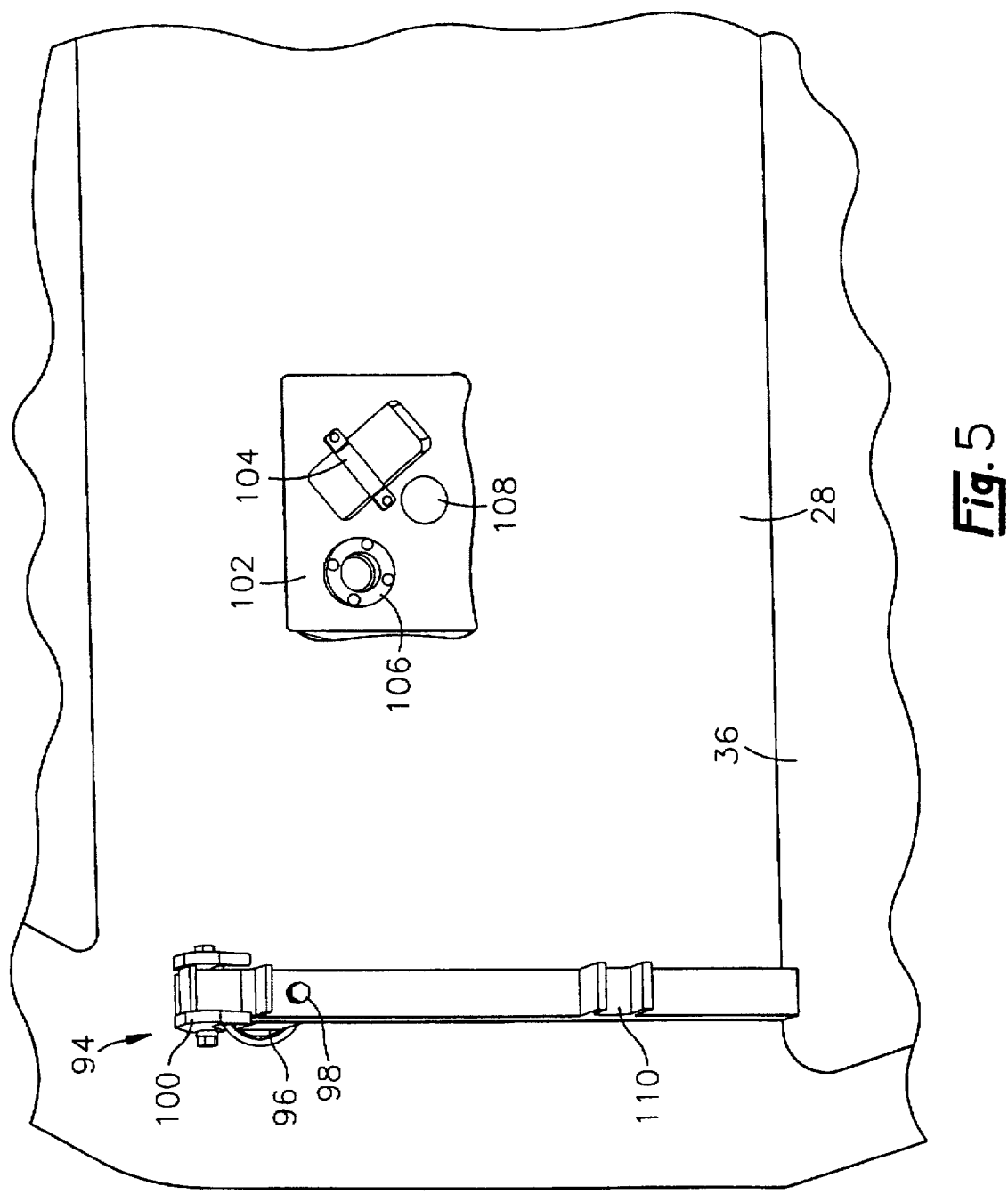
FIG. 5 is a plan view of an inner side wall of the vehicle with an interior holder device disposed therein of the system of the present invention.

As shown in FIG. 5 an interior holder device 102 is disposed within the inner side wall 28 of vehicle 12. The interior holder device 102, similar to the license plate holder device 80, includes a bar 104 and receptacles 106 and 108.

Referring back to FIG. 2, the engagement member 68 includes a clasp device 76 for engaging bar 86 of the license plate holder device 80 when the system 10 is in the exterior tire mounted mode and for engaging bar 104 of the interior holder device 102 when the system 10 is in the interior tire mounted mode. The engagement member 68 further includes prongs 72 and 74 for engaging the receptacles 88 and 90, respectively, of the license plate holder device 80 when the system 10 is in the exterior tire mounted mode and for engaging the receptacles 106 and 108, respectively, of the interior holder device 102 when the system 10 is in the interior tire mounted mode. The engagement member 68 further includes a rod 78 that has a first end attached to the clasp device 76 and at a second end that is attached to a clasp release handle 66 that is attached to rounded bar 64. The clasp release handle 66 allows for releasing of the engagement member 68 from the license plate holder device 80 and thereby the system 10 from the exterior tire mounted mode when the engagement member 68 is attached to the license plate holder device 80 and the clasp release handle 66 is actuated. In the alternative, the clasp release handle 66 allows for releasing of the engagement member 68 from the interior holder device 102 and the system 10 from the interior tire mounted mode when the engagement member 68 is attached to the interior holder device 102 and the clasp release handle 66 is actuated.

Figure 7:
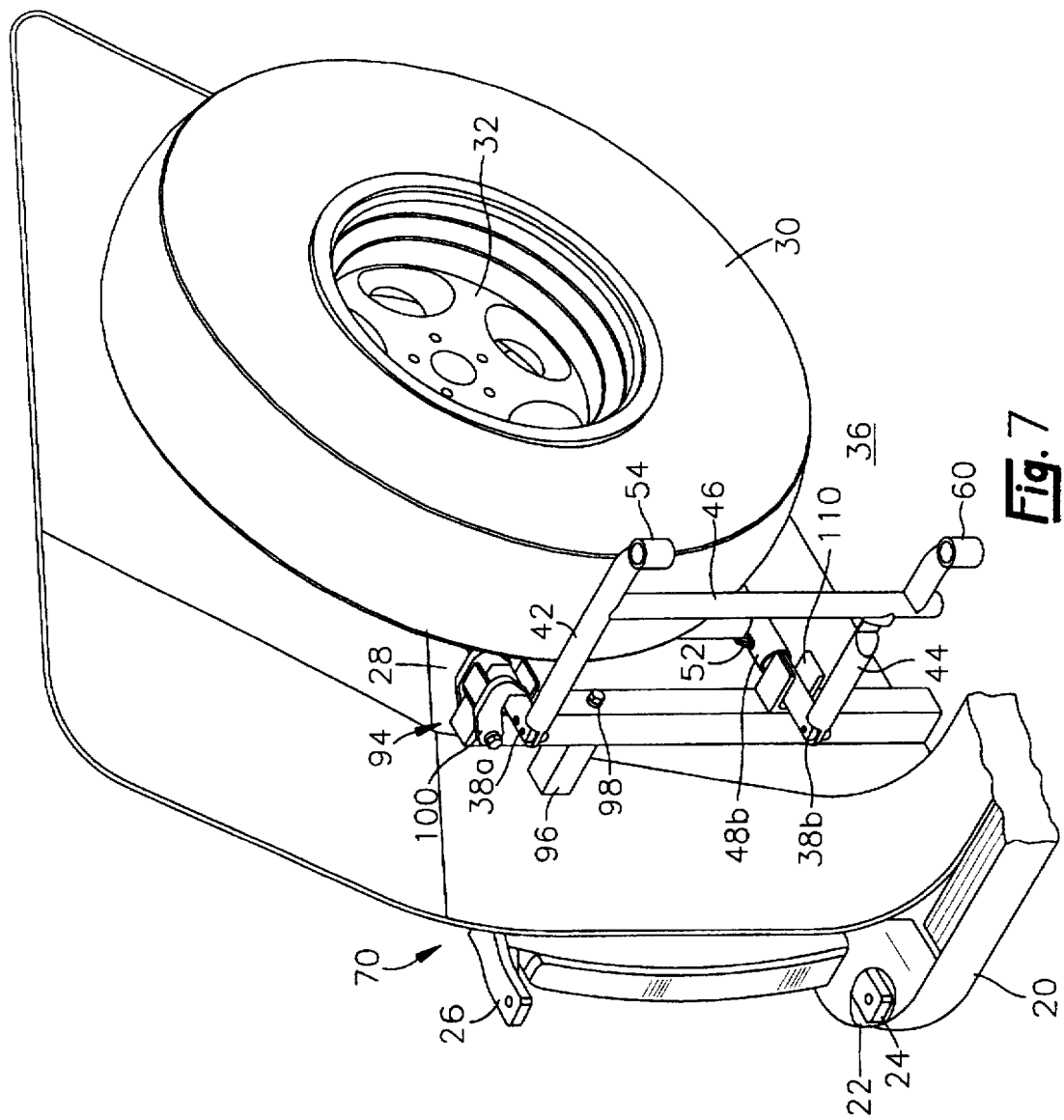
FIG. 7 is a perspective view of a retention device for securing the first and second bifurcated arms of the frame member when the system of the present invention is in the interior tire mounted mode.

Referring now to FIGS. 6 and 7, a retention device 94 is shown mounted to the interior side wall 28 and a floor board 36 of vehicle 12. Securing the retention device 94 to the interior side wall 28 of vehicle 12 is an extension member 96 through which a bolt 98 extends therethrough and screws into the interior side wall 28. The retention device 94 includes a clamp 100 that is rotatably attached to a first end of the retention device 94 and functions to secure the first arm 42 of frame member 40 when the system 10 is in the interior tire mounted mode. The retention device 94 further includes a securing device 110 that is attached to a second end of the retention device 94 and, secures the second arm 44 of the frame member 40 when the system 10 is in the interior tire mounted mode.

Once the spare tire 30 is secured to the interior side wall 28 of vehicle 12 and clamp 100 is securing arm 42 and device 110 is securing arm 44, bolts 56 and 58 must be removed such that the first support piece 46 and parts associated therewith, can be swung to the interior of the vehicle via hinges 38a and 38b. This allows for hatch 14 to then be swung shut.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A system for mounting a spare tire on a vehicle, the system having an exterior tire mounted mode and an interior tire mounted mode, the vehicle having a hatch, a license plate attached to the hatch, and a door frame partially surrounding the hatch, the system further comprising:

an exterior holder device disposed in the hatch;

an interior holder device disposed in an inner side wall of the vehicle;

an arm swivelably mounted to one side of the door frame of the vehicle at a first end portion, having a middle portion that is hinged, and having the spare tire mounted on a second end portion; and an engagement member attached at the second end portion of the arm, the engagement member including a device for engaging the exterior holder device when the system is in the exterior tire mounted mode and for engaging the interior holder device when the system is in the interior tire mounted mode.

2. A system for mounting a spare tire on a vehicle, the system having an exterior tire mounted mode and an interior tire mounted mode, the vehicle having a hatch, a license plate attached to the hatch, and a door frame partially surrounding the hatch, the system further comprising:

an exterior holder device disposed in the hatch comprising a license plate holder device;

an interior holder device disposed in an inner side wall of the vehicle;

an arm swivelably mounted to one side of the door frame of the vehicle at a first end portion, having a middle portion, and having the spare tire mounted on a second end portion; and an engagement member attached at the second end portion of the arm, the engagement member including a device for engaging the exterior holder device when the system is in the exterior tire mounted mode and for engaging the interior holder device when the system is in the interior tire mounted mode.

3. A system for mounting a spare tire on a vehicle, the system having an exterior tire mounted mode and an interior tire mounted mode, the vehicle having a hatch, a license plate attached to the hatch, and a door frame partially surrounding the hatch, the system further comprising:

an exterior holder device disposed in the hatch;

an interior holder device disposed in an inner side wall of the vehicle;

an arm swivelably mounted to one side of the door frame of the vehicle at a first end portion, having a middle portion, and having the spare tire mounted on a second end portion;

an engagement member attached at the second end portion of the arm, the engagement member including a device for engaging the exterior holder device when the system is in the exterior tire mounted mode and for engaging the interior holder device when the system is in the interior tire mounted mode; and a retention device mounted to the interior side wall and floor board of the vehicle adjacent to the interior holder device for securing the arm when the system is in the interior tire mounted mode.

4. A system for mounting a spare tire on a vehicle, the system having an exterior tire mounted mode and an interior tire mounted mode, the vehicle having a hatch, a license plate attached to the hatch, and a door frame partially surrounding the hatch, the system further comprising:

an exterior holder device disposed in the hatch;

an interior holder device disposed in an inner side wall of the vehicle;

a frame member comprising:

first and second bifurcated arms each being swivelably mounted to one side of the door frame of the vehicle at a first end portion, being hinged at a middle portion, and having the spare tire mounted on a second end portion; and a support piece slidably attached between the first and second arms at the middle portion, the support piece covering the hinged middle portion of the first and second arms when the system is in the exterior tire mounted mode and allowing the hinged middle portion of the first and second arms to become operable when the system is in the interior tire mounted mode; and an engagement member attached at the second end portion of the first and second arms, the engagement member comprising:

a device for engaging the exterior holder device when the system is in the exterior tire mounted mode and for engaging the interior holder device when the system is in the interior tire mounted mode.

5. The system of claim 4 wherein the holder device is a license plate holder device.

6. The system of claim 4 wherein the support piece includes a pivot tab for loosening or tightening the support piece to the first and second arms.

7. The system of claim 4 further comprising a retention device having a first end and a second end, the retention device being mounted to the interior side wall and floor board of the vehicle adjacent to the interior holder device for securing the first and second arms of the frame member when the system is in the interior tire mounted mode.

8. The system of claim 7 wherein the retention device includes a clamp rotatably attached to the first end of the retention device, the clamp securing the first arm of the frame member when the system is in the interior tire mounted mode.

9. The system of claim 8 wherein the retention device further includes a securing device attached to the second end of the retention device, the device securing the second arm of the frame member when the system is in the interior tire mounted mode.

10. A system for mounting a spare tire on a vehicle, the system having an exterior tire mounted mode and an interior tire mounted mode, the vehicle having a hatch, a license plate attached to the hatch, and a door frame partially surrounding the hatch, the system further comprising:

a license plate holder device disposed in the hatch and comprising:

bifurcated slots for slidably receiving the license plate therein;

a bar disposed within the license plate holder device; and a receptacle;

an interior holder device disposed in an inner side wall of the vehicle and comprising:

a bar disposed within the interior holder device; and a receptacle;

a frame member comprising:

first and second bifurcated arms each being swivelably mounted to one side of the door frame of the vehicle at a first end portion, being hinged at a middle portion, and having the spare tire mounted on a second end portion; and a support piece slidably attached between the first and second arms at the middle portion, the support piece including a pivot tab for loosening or tightening the support piece to the first and second arms, the support piece covering the hinged middle portion of the first and second arms when the system is in the exterior tire mounted mode;

a retention device mounted to the side interior wall and floor board of the vehicle adjacent to the interior holder device, the retention device having a first end and a second end, and further comprising:

a clamp rotatably attached to a first end of the retention device at, the clamp securing the first arm of the frame member when the system is in the interior tire mounted mode; and a securing device attached to the second end of the retention device, the device securing the second arm of the frame member when the system is in the interior tire mounted mode; and an engagement member attached at the second end portion of the first and second arms, the engagement member comprising:

a clasp device for engaging the bar of the license plate holder device when the system is in the exterior tire mounted mode and for engaging the bar of the interior holder device when the system is in the interior tire mounted mode; and a clasp release handle attached to the clasp device for releasing the engagement member from the license plate holder device and thereby the system from the exterior tire mounted mode when the engagement member is attached to the license plate holder device and the handle is actuated, and in the alternative, releasing the engagement member from the interior holder device and the system from the interior tire mounted mode when the engagement member is attached to the interior holder device and the handle is actuated.

11. The system of claim 10 wherein the engagement member further comprises a prong for engaging the receptacle disposed in the license plate holder device when the system is in the exterior tire mounted mode and for engaging the receptacle disposed in the interior holder device when the system is in the interior tire mounted mode.

* * * * *